(12) United States Patent
Freitag et al.

(10) Patent No.: US 7,068,009 B2
(45) Date of Patent: Jun. 27, 2006

(54) DRIVE ARRANGEMENT, ESPECIALLY FOR A LIFTING MECHANISM AND/OR A TRAVELING DRIVE

(75) Inventors: Holger Freitag, Bochum (DE); Anton Münzebrock, Dortmund (DE); Burkhard Hasenack, Hagen (DE); Giuliano Persico, Wetter (DE); Erik Appel, Wetter (DE)

(73) Assignee: Demag Cranes & Components GmbH, Wetter (DE)

( * ) Notice: Subject to any disclaimer, the term of this patent is extended or adjusted under 35 U.S.C. 154(b) by 52 days.

(21) Appl. No.: 10/878,207

(22) Filed: Jun. 28, 2004

(65) Prior Publication Data

US 2005/0012483 A1 Jan. 20, 2005

(30) Foreign Application Priority Data

Jun. 27, 2003 (DE) .................. 103 29 157

(51) Int. Cl.
*H02P 1/40* (2006.01)
*H02P 29/00* (2006.01)

(52) U.S. Cl. .................. 318/727; 318/747; 318/748; 318/779

(58) Field of Classification Search .................. None
See application file for complete search history.

(56) References Cited

U.S. PATENT DOCUMENTS

| 4,055,845 | A | * | 10/1977 | Ladrick | 343/715 |
|---|---|---|---|---|---|
| 4,864,201 | A | * | 9/1989 | Bernot | 318/480 |
| 5,005,382 | A | * | 4/1991 | Duve | 68/12.16 |
| 5,041,775 | A | | 8/1991 | Erdman | 318/812 |
| 6,121,749 | A | * | 9/2000 | Wills et al. | 318/811 |
| 6,516,485 | B1 | * | 2/2003 | Savkar et al. | 8/159 |
| 6,680,589 | B1 | * | 1/2004 | Neranjan et al. | 318/34 |
| 6,834,407 | B1 | * | 12/2004 | Stephens | 8/158 |
| 6,879,060 | B1 | * | 4/2005 | Hohri | 307/64 |
| 6,924,612 | B1 | * | 8/2005 | Ramirez et al. | 318/280 |

FOREIGN PATENT DOCUMENTS

| DE | 740259 | | 10/1943 |
|---|---|---|---|
| DE | 2311018 | A1 | 9/1974 |
| GB | 2023879 | | 1/1980 |
| GB | 2110488 | | 6/1983 |
| JP | 56078389 | | 6/1981 |
| JP | 59032372 | | 2/1984 |

OTHER PUBLICATIONS

European Search Report completed Nov. 11, 2004, from corresponding European Application No. EP 04 01 3985.

* cited by examiner

*Primary Examiner*—Marlon T. Fletcher
*Assistant Examiner*—Eduardo Colon Santana
(74) *Attorney, Agent, or Firm*—Van Dyke, Gardner, Linn & Burkhart, LLP

(57) ABSTRACT

The invention concerns a drive arrangement of a lifting gear and/or a traveling gear, with a pole-reversible rotary-current motor with windings for at least two different actuating speeds, with a pole switching element connecting the rotary-current motor to a voltage supply for changing between the actuating speeds of the rotary-current motor. In order to create a drive arrangement of a lifting gear and/or a traveling gear with a rotary-current motor, whose switching behavior is optimized in relation to the actuation of the rotary-current motor, it is proposed that a power switching element (3) be hooked up in front of the pole switching element (5), and it can be separated from the voltage supply via the power switching element (3) for the pole switching process of the rotary-current motor (2).

30 Claims, 2 Drawing Sheets

DRIVE ARRANGEMENT, ESPECIALLY FOR A LIFTING MECHANISM AND/OR A TRAVELING DRIVE

BACKGROUND OF THE INVENTION

The invention concerns a driving arrangement of a lifting gear and/or a traveling drive, particularly one having a pole-reversible rotary current motor with windings for at least two different drive speeds and with a pole switching element connecting the rotary current motor to a voltage supply in order to switch between the driving speeds of the motor.

In the state of the art, it is generally known how to employ electrical pole-reversible rotary-current induction motors for the horizontal or vertical movement of loads, for example, in traveling or lifting gears, whose direction of movement is reversible, in that two of the rotary current phases are exchanged with a reversing circuit. In addition, these rotary-current induction motors can have several windings, which have different numbers of pole pairs. Thus, the possibility exists of changing the rotary speed of the motor by a so-called pole reversal between the motor windings with the different numbers of pole pairs. The rotary speed ratio is then dictated by the pole number ratio of the motor windings. A customary solution for a pole reversing circuit involves switching contacts that are activated manually or with an electromagnetic drive. The latter are also known as contactors. In this case, the current involved in the power uptake of the motor is switched during both the reversal and the pole switching. All contacts of the contactors switch the full motor current during a change in direction of turning and/or the number of revolutions. Interruption of the current during inductive loads, which are produced here by the motor windings, results in sparking at the contacts. The spacing of the contacts must be chosen such that the spark is quickly extinguished and the contact itself withstands the resulting high temperatures without damage. It is necessary to design all control contactors for this type of operation. Reversing contactor and pole switching contactor have been dimensioned in accordance with the above-described mode of operation.

Known solutions, such as are described in the German application DE 39 07 853 A1, have two contactors with at least six power contacts for the reversal and at least one additional contactor with at least four power contacts for the pole switching. The space requirement and costs of the contactors increase out of proportion to the power being switched. Instead of control contactors, one can also use electronic semiconductor switches, although they, in turn, are more cost-intensive.

A switch combination with an on/off switch with a reversing switch in a common switch housing is already familiar from German application DE 40 26 376 A1, in which the reversing switch for the actuating of an electric motor is interlocked relative to the on/off switch. The purpose of this interlocking is to prevent the reversing switch for changing the direction of turning of the electric motor from being activated when the on/off switch is still in its on position and, thus, the electric motor is still being supplied with energy. The reversing switch can, therefore, only be operated in the current-free condition, which should prevent damage or destruction of the switching contacts of the reversing switch. This switch combination is used, for example, for the switching of an electric motor in a machine tool.

This mechanical solution naturally means that the switching times of the switch combination and, thus, its area of application are limited.

An air-conditioning unit is known from U.S. Pat. No. 5,041,775, whose blower is provided with a reversible alternating-current motor, whose drive speed can be changed between two speeds by means of a reversing element. A power switch is hooked up in front of the reversing element, by which the blower motor can be switched to the powerless state during the speed change.

SUMMARY OF THE INVENTION

The task of the present invention is to create a driving arrangement of a lifting gear and/or a traveling gear, with a pole-reversible rotary-current motor, whose switching behavior is optimized in relation to the actuating of the rotary-current motor.

According to the invention, a driving arrangement of a lifting gear and/or a traveling gear, with a pole-reversible rotary-current motor with windings for at least two different driving speeds, with a pole switching element connecting the rotary-current motor to a voltage supply in order to switch between the actuating speeds of the rotary-current motor, is achieved in that a power switch element is hooked up in front of the pole switching element and the rotary-current motor can be separated by the power switch element from the voltage supply for the pole switching process, so that the pole switching element can be switched in the current-free state. Since the lifetime of the contacts for the switching of the motor current depends on the magnitude of the current being switched, this will extend the service life of the switch contacts. Since the switching is done in the currentless condition, according to the invention, the switch elements for the pole switching and reversing can accordingly be smaller in dimension. All that is needed is a low switching capacity, that is, low contact forces and short contact spacings to be overcome. The switch contacts also become more economical.

A key notion of the present invention is the separation of a load switching function and contact logic for direction and speed in pole-reversible rotary-current induction motors.

In an advantageous configuration, a reversing switch element is hooked up in front of the pole switching element, by which the direction of turning of the rotary-current motor can be changed in familiar fashion. According to the invention, this reversing switch element for the reversing process can be separated by the power switch element from the voltage supply and the switching process occurs current-free.

It is especially advantageous for the power switch element and the pole switching element, or the pole switching element and the reversing switch element, to be connected to a control logic, and for the control logic to bring about a sequential actuating of the power switch element, the pole switching element or the pole switching element and the reversing switch element in such a way that the pole switching element, or the pole switching element and the reversing switch element, are separated from the voltage supply via the appropriately actuated power switch element prior to each switching event, and after the switching event occurs they are again connected to the voltage supply via the power switch element. In this way, one can easily accomplish a sequential control of the power switch element, the pole switching element, and the reversing switch element. The switching logic can achieve switch times of the pole switching element, or the pole switching element and the reversing switch element, that are less than 200 ms, preferably less than 50 ms. Since the switching times are so low, the drive control, according to the invention, can also be used to actuate pole-reversible rotary-current motors in lifting gears or in traveling gears without the field of the electric motor collapsing in the currentless switch time and allowing a load to drop.

In a simple structural embodiment, the power switch element has three power switching contacts, two of which are connected to reversing contacts of the two-pole reversing switch element. Another power switching contact is directly connected to one of the windings and the reversing contacts are each connected at the output side to one of the two pole switching contacts of the two-pole pole switching element.

In another embodiment, the control logic accomplishes an actuating of the power switch element and/or the reversing switch element in such a way that their switching events are synchronized with the number of revolutions of the rotary-current motor. Accordingly, the switching events initiated by the operator are triggered only when the motor conditions "STANDSTILL", "SLOW RUNNING" or "FAST RUNNING" are achieved.

This enables a switching without jerks between various speeds. When the motor is accelerating from standstill, this is accomplished with a low starting current of the motor. For this, the high-pole winding is first switched and upon reaching the desired rated number of revolutions, there is a switch to the low-pole winding for high speeds. On the contrary, to slow down the motor from a fast speed, a slowdown without jerks is achieved by switching the high-pole winding when the synchronous speed is achieved. Thus, one can accomplish a change in direction by slowing down to standstill and accelerating or restarting in the opposite direction.

In addition, it is possible to control the optimal switching time, even with changeable loads, and for both directions of turning. The acceleration or its time to achieve the desired rated speed depends on the load and the direction of turning. Thus, with heavy loads being lifted, longer acceleration times occur, and with heavy loads being lowered, shorter acceleration times. These effects can be avoided or compensated by synchronization.

In one embodiment, a brake, especially an electromechanical brake, can be provided, whose actuation during the braking process will depend on the speed of the rotary-current motor. The switching event during the braking can also be synchronized with the speed of the rotary-current motor. The synchronization is advantageously embodied by the rotary-current motor and its actuation by means of the control logic. Thus, it is possible for a braking process in generator mode or a braking process with reverse current to be switched off at the proper speed. In addition, a mechanical brake can be provided, especially on the motor shaft. In order to keep the wear on the mechanical brake low and, thus, achieve a long service life, one can first brake from the "FAST RUNNING" condition to the "SLOW RUNNING" condition by running the rotary-current motor as a generator or feeding in reverse current. To achieve an uninterrupted deceleration or braking down to "STANDSTILL" in generator mode, the high-pole winding is then switched off and the mechanical brake activated. When braking by means of reverse current, one can also decelerate or brake electrically down to standstill, and then the power switch element has to be switched off at standstill in order to prevent a restarting in the other direction.

It is advantageous for the power switch element to have three power switching contacts and one auxiliary contact, two of them being connected to reversing contacts of the two-pole reversing switch element and another one being directly connected to one of the windings and the reversing contacts being each connected at the output side to one of the two pole switching contacts of the two-pole switching element, and the auxiliary contact is connected to the mechanical brake.

The time between the switch off and the switching on again of the power switch element is also adjusted according to the nature of the switching cycle in these embodiments. For example, a time between 50 ms and 100 ms is especially suitable for a pole switching. For a phase switching (reversal), a duration of more than 150 ms is suitable. The different choice of times will serve to prevent a triggering of the mechanical brake. In addition, a short circuit during the phase switching by the switch arc can be prevented.

Preferably, a pulse transmitter is provided, which supplies a rotary speed signal to the control logic for actuating the power switch element and/or the reversing switch element in order to synchronize their switching processes with the speed of the rotary-current motor.

These and other objects, advantages and features of this invention will become apparent upon review of the following specification in conjunction with the drawings.

DESCRIPTION OF THE PREFERRED EMBODIMENT

Figure 1:
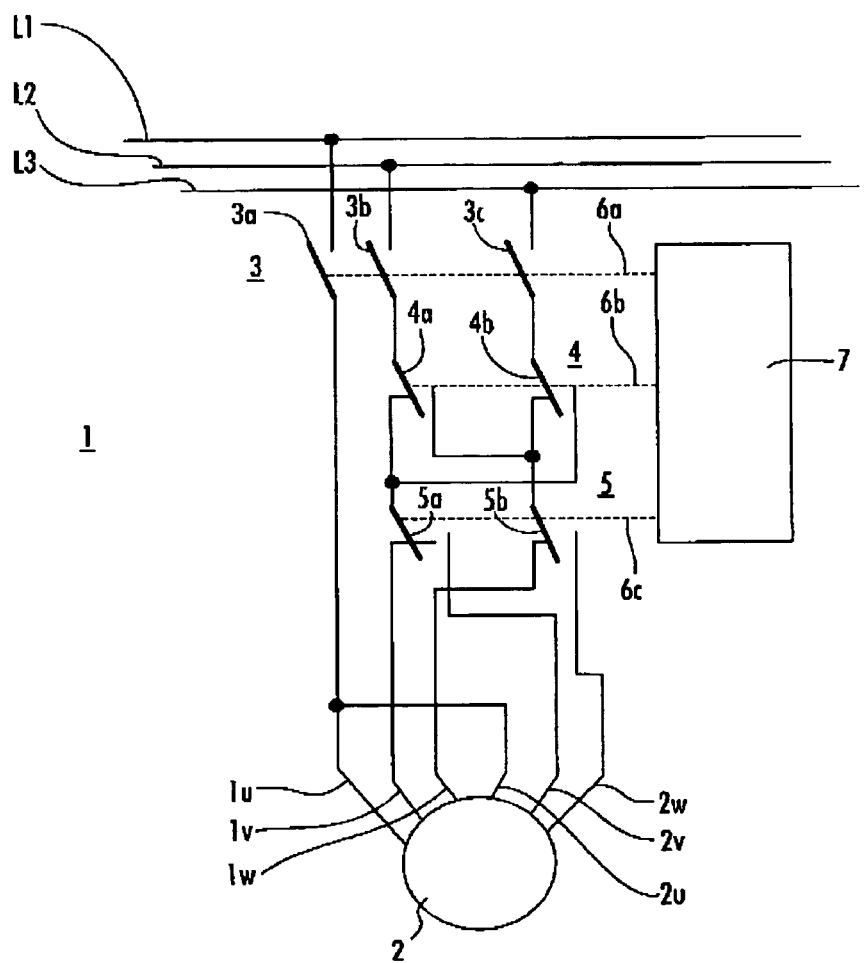
FIG. 1 an embodiment of a driving circuit for a pole-reversible rotary-current motor.

The invention shall now be explained more closely by means of a first sample embodiment represented in FIG. 1. FIG. 1 shows a driving circuit 1 for a pole-reversible rotary-current motor 2, in particular, a rotary-current induction motor. The rotary-current motor 2 has two three-phase windings with different numbers of pole pairs, designated by the letters 1U, 1V, 1W, 2U, 2V and 2W.

The driving circuit 1, and thus also the rotary-current motor 2, is provided with energy via a rotary-current supply, of which the strands L1, L2 and L3 are shown. The drive circuit 1 consists here basically—looking from the strands L1, L2, L3 in the direction of the rotary-current motor 2—of a load switch element 3, which is connected to a reversing switch element 4 and a pole switching element 5.

The load switching element 3 is configured as a traditional power contactor with three power switch contacts 3a, 3b, 3c, which are associated accordingly at the input side with the three strands L1, L2, L3 of the energy supply. Via these three mechanically interconnected power switch contacts 3a, 3b, 3c, the rotary-current motor 2 can be separated at all poles from the strands L1, L2, L3 by a switching process.

At the output side, the first power switch contact 3a assigned to strand L1 is connected directly to the winding 1U of the rotary-current motor 2. The second power switch contact 3b assigned to strand L2 is connected at the output via a corresponding line to a first reversing contact 4a of the two-pole reversing switch element 4 and the third power switch contact 3b assigned to strand L3 is connected to a second reversing contact 4b of the reversing switch element 4. The two power switch contacts 3a and 3b can be moved jointly from a first switch position "RIGHT RUNNING" to a second switch position "LEFT RUNNING". In the first switch position "RIGHT RUNNING", the first reversing contact 4a is connected at the output to the input side of a first pole switching contact 5a and the second reversing contact 4b is connected at the output to the input side of a second pole switching contact 5b of the two-pole pole switching element 5. In the switch position "LEFT RUNNING", the two strands L2 and L3 are exchanged for each other, so that the first reversing contact 4a is connected at the output to the input side of the second pole switching contact 5b and the second reversing contact 4b is connected at the output to the input side of the first pole switching contact 5a.

The pole switching element 5 is electrically connected at its output by its pole switching contacts 5a and 5b to the windings 1V, 1W, 2V, 2W, depending on the position of the pole switching contacts 5a and 5b. In the switch position "SLOW RUNNING", the first pole switching contact 5a is connected to the winding 1V and the second pole switching contact 5b to the winding 1W. In the other switch position "FAST RUNNING", the first pole switching contact 5a is connected to the winding 2V and the second pole switching contact 5b to the winding 2W.

Because the load switch element 3 can separate the rotary-current motor 2 at all poles from the strands L1, L2, L3 of the rotary-current supply, it is possible to switch the reversing switch element 4 with its two reversing contacts 4a and 4b and the pole switching element 5 with its two pole switching contacts 5a and 5b in the currentless condition. As a result, the two reversing contacts 4a and 4b of the reversing switch element 4 and the two pole switching contacts 5a and 5b of the pole switching element 5 experience practically no electrical contact wear and do not need to be designed in a size which enables a switching under load. This also correspondingly reduces the structural size and it is possible to employ small contactors, relays, or semiconductor gates.

The load switching element 3, the reversing switch element 4, and the pole switching element 5 are connected to a control logic 7 via actuating lines 6a, 6b, 6c. The switching logic 7 is connected at the input to switches (not shown), which are assigned the control functions "STANDSTILL", "RIGHT RUNNING", "LEFT RUNNING", "FAST RUNNING" and "SLOW RUNNING". If one of the switches is activated, the switching logic 7 first ensures that the rotary-current motor 2 is separated from the strands L1, L2, L3 by the load switching element 3, and then the control function pertaining to the activated switch is executed by appropriate switching of the reversing switch element 4 and/or the pole switching element 5. After this, the load switching element 3 is, again, activated and, thus, the rotary-current motor 2 is, again, supplied with current in the desired operating mode from the strands L1, L2, L3 via the load switching element 3, the reversing switch element 4 and/or the pole switching element 5. Thus, according to the invention, the reversing switch element 4 and/or the pole switching element 5 are switched exclusively in the current free state. The switching logic 7 thus essentially has the function of a sequential control for the time sequence of switching processes to execute the control functions and makes it possible to achieve short switching times. When the rotary-current motor 2 is used in a lifting gear, the switching times are less than 50 ms. Thus, a dropping of the load is reliably prevented. When the rotary-current motor 2 is used in a traveling gear, the switching times are less than 200 ms.

Furthermore, in a preferred embodiment, it is provided in the switching logic 7 that the activating of the power switch element 3 is synchronized with the frequency of rotary current supply or the number of revolutions of the rotary-current motor 2. Starting in this way, one can then optimally select the time for switching on and off of the power switch element 3 and thus advantageously achieve less wear on the contacts and the mechanical components of the drive. Thanks to the sequential control within the switching logic 7, it is also possible to optimally control the times for releasing or engaging of a brake, independently of each other. Also, undesirable command sequences by an operator can be prevented by means of the switching logic 7.

Preferably, the switching logic 7 is configured as a programmable IC (for example, ASIC, microprocessor, PGA). The switching logic 7, which is already present for the drive circuit of the invention can also be used to realize additional functions, such as electrical braking via the high-pole winding, starting via the high-pole winding, "tap prevention" and/or detection of the number of revolutions.

By "tapping" it is meant a fast repeated activating of the "RIGHT RUNNING" or "LEFT RUNNING" control pushbutton by the operator. The acceleration time for rotary-current motors hooked up to the mains is in the range of <1 s. By a fast tapping with repetition times <1 s, the motor starting current is repeatedly switched on and off. As is known, the starting current for rotary-current motors hooked up to the mains is a multiple of the rated current (typical factor: 6–7). During tapping, the switch contacts repeatedly switch the starting current on and off; this leads to premature wear on the switch contacts. The "tap prevention" forbids a tapping with repetition times below the acceleration time of the motor. Operations of the buttons within the acceleration time are ignored by the sequence logic, so that a repeated switching of the starting current is not possible.

For applications in which disruptions caused by switch arcing of the three-pole power switch element 3 must be avoided, the latter can be replaced by a semiconductor switch with little expense. This will also extend the lifetime of the invented drive circuit by many times.

Figure 2:
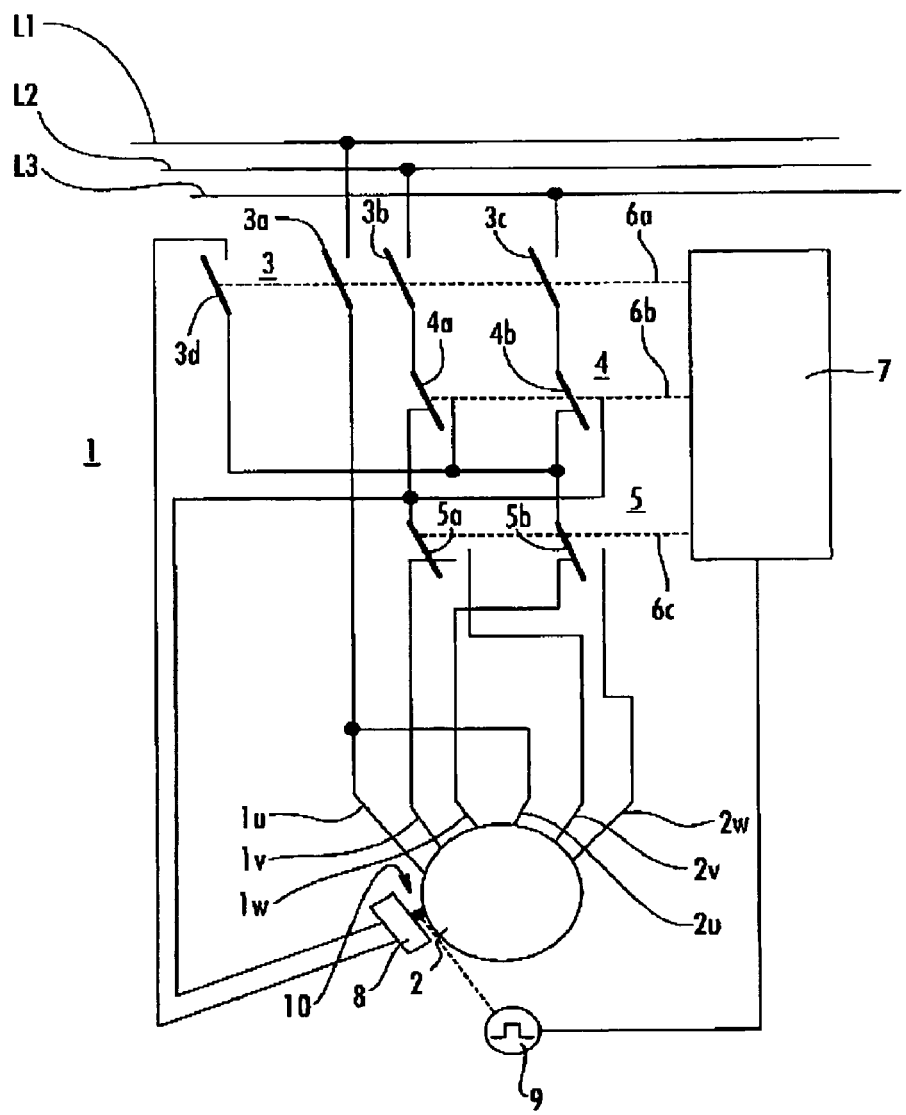
FIG. 2 is another embodiment of a driving circuit for a pole-reversible rotary-current motor with a mechanical brake.

The embodiment per FIG. 2 differs from the embodiment described above essentially by the presence of a mechanical brake 8, a pulse transmitter 9, and a suitable interconnection of these, so that the same reference numbers as in FIG. 1 are used.

The brake 8 is arranged on the shaft 10 of the rotary-current motor 2. The pulse transmitter 9 is a device familiar to the practitioner for determining the number of revolutions of the motor 2. This is likewise arranged on the shaft 10 of the motor and furnishes pulses to the switching logic 7 in order to determine the number of revolutions of the motor 2 (cf. above).

The load switching element 3 in this embodiment as well is configured as a traditional power contactor with three power switching contacts 3a, 3b, 3c, which are assigned accordingly at the input side to the three strands L1, L2, L3 of the power supply. By means of the three power switching contacts 3a, 3b, 3c that are mechanically interconnected, the rotary-current motor 2 can be separated at all poles from the strands L1, L2, L3 by one switching event. In addition, an auxiliary contact 3d is present, which is hooked up to the brake 8 and serves to switch it on and off.

The mechanical brake 8 is connected at one side via a corresponding line directly to the input side of the second pole switching contact 5a and at the other side to the output side of the auxiliary contact 3d. The auxiliary contact 3d is connected at the input side to the input side of the first pole switching contact 5a. In all conditions "STANDSTILL", "RIGHT RUNNING", "LEFT RUNNING", "FAST RUNNING" and "SLOW RUNNING", the brake 8 is released as soon as the power contacts 3a, 3b and 3c as well as the auxiliary contact 3d have been switched and a current is flowing through the brake 8. This ensures that the motor 2 does not have to start to run against the brake. Furthermore, the brake 8 is engaged automatically, e.g., by spring action, as soon as the current flow to the motor 2 is interrupted by opening the power switching contacts (and the auxiliary contact). Also, the actuation of the brake 8 is synchronized to the number of revolutions of the rotary-current motor 2 by the switching logic 7.

In other respects, the embodiment of FIG. 2 corresponds to that of FIG. 1.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. Drive arrangement for a pole-reversible rotary-current motor with windings for at least two different actuating speeds, said drive arrangement comprising:
   a pole switching element having pole switching contacts, said pole switching contacts selectively connecting the windings of the rotary-current motor to a voltage supply for changing between the actuating speeds of the rotary current motor,
   a power switching element that is electrically connected between said pole switching element and the voltage supply, said power switching element having at least two power switching contacts, said at least two power switching contacts being connected to said pole switching contacts of said pole switching element, wherein said pole switching element is separated from the voltage supply via the at least two power switching contacts during the pole switching process of the rotary-current motor, wherein said pole switching element can be switched in a current-free state.

2. The drive arrangement of claim 1, including a reversing switch element that is electrically connected between said pole switching element and said power switching element, wherein said reversing switch element is adapted to changing the direction of turning of the rotary-current motor and said reversing switch element is separated from the voltage supply via the power switching element for the reversing process of the rotary-current motor.

3. The drive arrangement of claim 2, wherein said power switching element, said pole switching element and said reversing switch element are connected to a control logic and said control logic accomplishes a sequential actuation of said power switching element, said pole switching element, and said reversing switch element, such that said pole switching element and said reversing switch element are separated from the voltage supply via the appropriately actuated power switching element before each switching process.

4. The drive arrangement of claim 3, wherein switching time of at least one of said pole switching element and said reversing switch element is less than 200 ms.

5. The drive arrangement of claim 4, wherein said switching time is less than 50 ms.

6. The drive arrangement of claim 4, wherein said power switching element has three power switching contacts, two of said power switching contacts being connected to reversing switch contacts of said reversing switch element and another of said power switching contacts being directly connected to one of the motor windings and wherein said reversing contacts are each connected at the output side to a contact of said pole switching element.

7. The drive arrangement of claim 6, wherein said control logic accomplishes an actuation of said power switching element and/or said reversing switch element such that switching processes of said at least one of said power switching element and said reversing switch element are synchronized with the number of revolutions of the rotary-current motor.

8. The drive arrangement of claim 7, including a brake, wherein actuation of said brake is synchronized with the number of revolutions of the rotary-current motor.

9. The drive arrangement of claim 8, wherein said brake comprises an electromechanical brake.

10. The drive arrangement of claim 9, wherein said electromechanical brake is actuated by said control logic.

11. The drive arrangement of claim 10, wherein said electromechanical brake is on said motor shaft.

12. The drive arrangement of claim 11, wherein said power switching element has three power switching contacts and one auxiliary contact, two of said contacts being connected to reversing contacts of said reversing switch element and another of said contacts being directly connected to one of the motor windings and wherein said reversing contacts are each connected at the output side to a contact of the pole switching element and said auxiliary contact is connected to said electromechanical brake.

13. The drive arrangement of claim 12, including a pulse transmitter, said pulse transmitter furnishes a rotary speed signal to said control logic for actuating said power switching element and/or said reversing switch element in order to synchronize the switching processes of said power switching element and/or said reversing switch element with the number of revolutions of the rotary-current motor.

14. The drive arrangement of claim 2, wherein said power switching element has three power switching contacts, two of said power switching contacts being connected to reversing switch contacts of said reversing switch element and another of said power switching contacts being directly connected to one of the motor windings and wherein said reversing contacts are each connected at the output side to a contact of said pole switching element.

15. The drive arrangement of claim 2, wherein said control logic accomplishes an actuation of said power switching element and/or said reversing switch element such that switching processes of said power switching element and/or said reversing switch element are synchronized with the number of revolutions of the rotary-current motor.

16. The drive arrangement of claim 3, wherein said power switching element has three power switching contacts, two of said power switching contacts being connected to reversing switch contacts of said reversing switch element and another of said power switching contacts being directly connected to one of the motor windings and wherein said reversing contacts are each connected at the output side to a contact of said pole switching element.

17. The drive arrangement of claim 1, wherein said power switching element, said pole switching element and said reversing switch element are connected to a control logic and said control logic accomplishes a sequential actuation of said power switching element, said pole switching element, and said reversing switch element, such that said pole switching element and said reversing switch element are separated from the voltage supply via the appropriately actuated power switching element before each switching process.

18. The drive arrangement of claim 17, wherein switching time of at least one of said pole switching element and said reversing switch element is less than 200 ms.

19. The drive arrangement of claim 18, wherein said switching time is less than 50 ms.

20. The drive arrangement of claim 18, wherein said power switching element has three power switching contacts, two of said power switching contacts being connected to reversing switch contacts of said reversing switch element and another of said power switching contacts being directly connected to one of the motor windings and wherein said reversing contacts are each connected at the output side to a contact of said pole switching element.

21. The drive arrangement of claim 19, wherein said control logic accomplishes an actuation of said power switching element and/or said reversing switch element such that switching processes of said power switching element and/or said reversing switch element are synchronized with the number of revolutions of the rotary-current motor.

22. The drive arrangement of claim 21, including a brake, wherein actuation of said brake is synchronized with the number of revolutions of the rotary-current motor.

23. The drive arrangement of claim 22, wherein said brake comprises an electromechanical brake.

24. The drive arrangement of claim 23, wherein said electromechanical brake is actuated by said control logic.

25. The drive arrangement of claim 24, wherein said electromechanical brake is on said motor shaft.

26. The drive arrangement of claim 25, wherein said power switching element has three power switching contacts and one auxiliary contact, two of said contacts being connected to reversing contacts of said reversing switch element and another of said contacts being directly connected to one of the motor windings and wherein said reversing contacts are each connected at the output side to a contact of the pole switching element and said auxiliary contact is connected to said electromechanical brake.

27. The drive arrangement of claim 26, including a pulse transmitter, said pulse transmitter furnishes a rotary speed signal to said control logic for actuating said power switching element and/or said reversing switch element in order to synchronize the switching processes of said power switching element and/or said reversing switch element with the number of revolutions of the rotary-current motor.

28. The drive arrangement of claim 1, including an electromechanical brake on a motor shaft.

29. Drive arrangement for a pole-reversible rotary-current motor with windings for at least two different actuating speeds, said drive arrangement comprising:

a pole switching element connecting the rotary-current motor to a voltage supply for changing between the actuating speeds of the rotary current motor, a power switching element that is electrically connected between said pole switching element and the voltage supply, wherein said pole switching element is separated from the voltage supply via the power switching element during the pole switching process of the rotary-current motor, including an electromechanical brake on a motor shaft, wherein said power switching element has three power switching contacts and one auxiliary contact, two of said contacts being connected to reversing contacts of said reversing switch element and another of said contacts being directly connected to one of the motor windings and wherein said reversing contacts are each connected at the output side to a contact of the pole switching element and said auxiliary contact is connected to said electromechanical brake.

30. The drive arrangement of claim 29, including a pulse transmitter, said pulse transmitter furnishes a rotary speed signal to said control logic for actuating said power switching element and/or said reversing switch element in order to synchronize the switching processes of said power switching element and/or said reversing switch element with the number of revolutions of the rotary-current motor.

* * * * *